(12) United States Patent
Voss

(10) Patent No.: US 8,132,590 B2
(45) Date of Patent: Mar. 13, 2012

(54) VALVE ASSEMBLY WITH AT LEAST ONE TRANSVERSE CHANNEL IN A VALVE HOUSING

(75) Inventor: Christoph Voss, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 272 days.

(21) Appl. No.: 12/527,726

(22) PCT Filed: Feb. 19, 2008

(86) PCT No.: PCT/EP2008/051956
§ 371 (c)(1),
(2), (4) Date: Aug. 19, 2009

(87) PCT Pub. No.: WO2008/110435
PCT Pub. Date: Sep. 18, 2008

(65) Prior Publication Data
US 2010/0019180 A1    Jan. 28, 2010

(30) Foreign Application Priority Data

Mar. 10, 2007   (DE) .......................... 10 2007 011 767
Jan. 17, 2008   (DE) .......................... 10 2008 004 780

(51) Int. Cl.
*F16K 31/06*    (2006.01)

(52) U.S. Cl. ......... 137/315.01; 137/315.03; 251/129.15; 251/366

(58) Field of Classification Search ............. 251/129.15, 251/366, 367; 303/119.2; 137/315.03, 315.27, 137/315.01
See application file for complete search history.

(56) References Cited

U.S. PATENT DOCUMENTS

| | | | | |
|---|---|---|---|---|
| 4,417,602 A | * | 11/1983 | Moen | ........................ 137/625.17 |
| 6,318,703 B1 | | 11/2001 | Goossens | |
| 6,659,421 B1 | * | 12/2003 | Goossens | ................. 251/129.02 |

FOREIGN PATENT DOCUMENTS

DE          197 00 980 A1    7/1998
DE    10 2005 049 122 A1    10/2006

* cited by examiner

*Primary Examiner* — Kevin Lee
(74) *Attorney, Agent, or Firm* — RatnerPrestia

(57) ABSTRACT

A valve assembly with at least one transverse channel in a substantially tubular valve housing, the assembly including a valve closing member that is positioned in the valve housing and that co-operates with a valve seat situated on a hollow cylindrical valve seat body that is fixed in the valve housing, the valve seat body being attached to one end of the valve housing. To simplify the production process, the transverse channel is formed by a longitudinal slot which extends in some sections of the valve housing from a starting point at the end of said housing in the longitudinal direction of the latter.

10 Claims, 1 Drawing Sheet

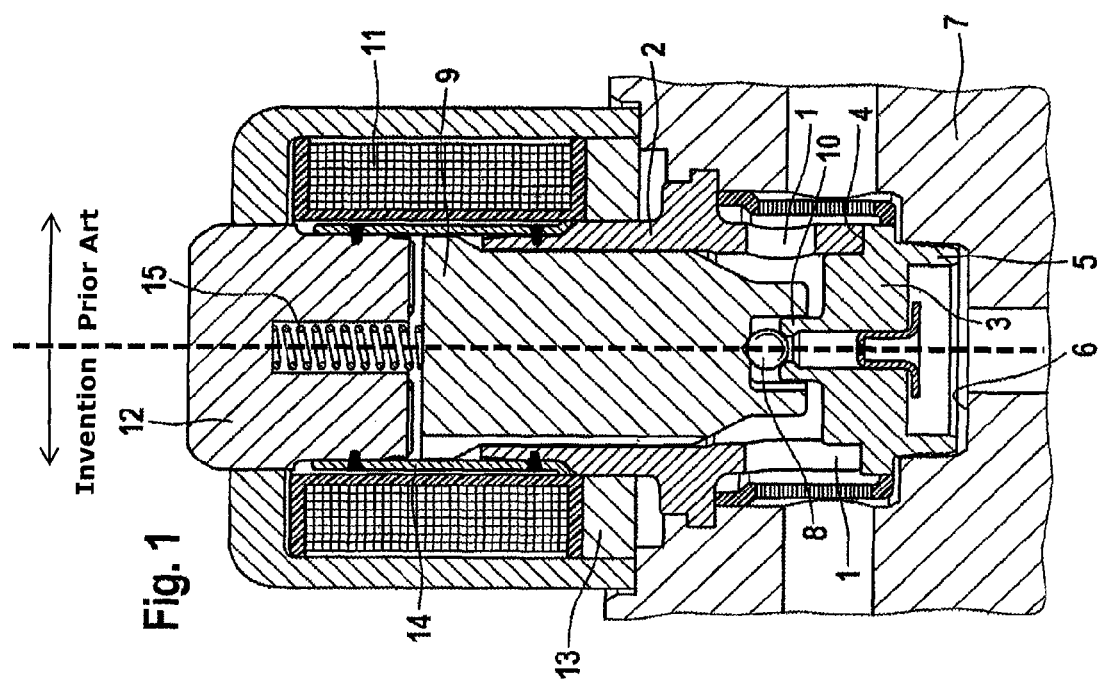
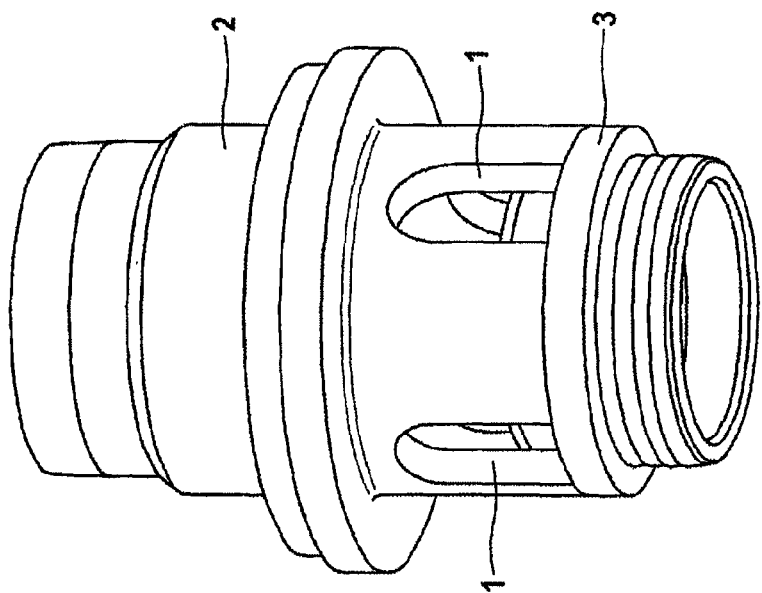

VALVE ASSEMBLY WITH AT LEAST ONE TRANSVERSE CHANNEL IN A VALVE HOUSING

CROSS REFERENCE TO RELATED APPLICATIONS

This application is the U.S. national phase application of PCT International Application No. PCT/EP2008/051956, filed Feb. 19, 2008, which claims priority to German Patent Application No. DE 10 2007 011 767.3, filed Mar. 10, 2007 and German Patent Application No. DE 10 2008 004 780.5, filed Jan. 17, 2008, the contents of such applications being incorporated by reference herein.

BACKGROUND OF THE INVENTION

1. Field of the Invention
The invention relates to a valve assembly.
2. Description of the Related Art
Already known from DE 102005049122 A1 is a valve assembly of this type which has a conventional configuration of a transverse channel 1 in the valve housing; according to this document the transverse channel 1 can be formed as a transverse bore, by drilling or punching, and therefore by separate production steps and complex and costly finishing work on the valve housing, only after the valve housing has been produced.

SUMMARY OF THE INVENTION

It is therefore the object of the present invention to improve a valve assembly of the type stated in such a manner that, through appropriate configuration of the transverse bore, a complex and costly production operation can be dispensed with.

BRIEF DESCRIPTION OF THE DRAWINGS

Further features and advantages of the invention are apparent from the following description of a number of exemplary embodiments with reference to two drawings, in which:

FIG. 1 shows a longitudinal section through a valve assembly, and

FIG. 2 is a perspective view of the inventive configuration of the valve housing, which can be seen in the left-hand half of the representation in FIG. 1.

DETAILED DESCRIPTION OF THE PREFERRED EMBODIMENTS

FIG. 1 discloses in longitudinal section a valve assembly which has at least one transverse channel 1 in a valve housing 2 of substantially tubular configuration, with a valve-closing member 8 arranged axially movably in the valve housing 2 and directed towards a valve seat which is arranged on a hollow-cylindrical valve seat body 3 fixed in the valve housing 2 and mounted on a lower end thereof.

The state of the art hitherto with respect to the conventional configuration of a transverse channel 1 can be seen to the right of the axis of symmetry of the valve in FIG. 1, according to which the transverse channel 1 can be formed as a transverse bore by drilling or punching, and therefore by a plurality of production steps and complex and costly finishing work on the valve housing 2, only after the valve housing has been produced.

To the left of the axis of symmetry of the valve in FIG. 1 the transverse passage 1 is now formed according to aspects of the invention by a longitudinal slot which, starting from the lower end of the valve housing 2, extends into the jacket of the valve housing 2 over a section thereof in its longitudinal direction. Through the inventive configuration, the transverse channel 1 can now advantageously be produced in a single work cycle during the shaping of the valve housing 2, so that the complex and costly drilling or punching of the transverse channel 1 known from the prior art is dispensed with. In conjunction with the transverse channel 1 according to aspects of the invention, the valve housing 2 can be produced especially simply in terms of production technology through a cold-forming process suitable for automation, without the need to undertake further finishing work.

As is apparent from the left-hand half of FIG. 1, the transverse channel 1 in the form of a longitudinal slot is partially covered by the valve seat body 3 mounted on the end of the valve housing 2, for which purpose the valve seat body 3 is pressed into the lower end of the tubular valve housing 2 over a section thereof. To limit the pressed-in depth, the valve seat body 3 has an axial stop 4 which bears against the lower end of the wall section of the valve housing 2 which delimits the transverse bore 1. In addition, the valve seat body 3 has on the side oriented away from the valve housing 2 a projection 5 which is fixed in a liquid-tight manner in a valve-receiving bore 6 by means of a press fit. In order to maximize the sealing and fixing effect, the circular projection 5 has on its outer periphery a plurality of grooves or a fir-cone or sawtooth contour.

By contrast, the valve housing 2 is securely fixed in a valve-receiving body 7 by external caulking of the housing material adjacent to the valve-receiving bore 6 by the exertion of axial force in the direction of the valve seat body 3.

To supplement the explanations given up to now, FIG. 2 is a perspective view of the features essential to the invention, from which the configuration of the valve housing 2 with the transverse channels 1 integrated therein is especially clearly apparent, which transverse channels 1 are slightly covered by the valve seat body 3 pressed into the valve housing 2 from below. It emerges clearly from FIG. 2 that a plurality of transverse channels 1 are distributed uniformly around the circumference of the valve housing 2, for which reason the end of the valve housing 2 has a crown-shaped contour as a result of the transverse channels 1 configured as longitudinal slots. The longitudinal slots, produced at the same time by cold forming during the production of the valve housing 2, have an arcuately rounded contour in their closed end region, so that mechanical stress peaks are thereby avoided and low resistance to the flow through the transverse channels 1 is ensured.

As shown in the selected representation in FIG. 1, the invention presented here is clarified by the example of a solenoid valve, for which reason the spherical valve-closing member 8 is positioned above the valve seat inside a blind bore of an armature 9. The armature 9 is precisely guided both in its upper region inside the two-part valve housing 2 and in its lower region on a tubular extension 10 of the valve seat body 3 extending into the blind bore. For the electromagnetic actuation of the armature 9, an electrical coil 11 is fitted over the valve housing 2, the yoke part of which coil 11 contacts on one side a magnetic core 12 which closes the valve housing 2 and on the other side the magnetizable tubular part of the valve housing 2 via a magnetic disc 13. To avoid a short circuit in the magnetic circuit, the further tubular part 14 of the valve housing 2 arranged between the magnetizable tubular part of the valve housing 2 and the magnetic core 12 is made of a non-magnetizable material.

The valve assembly illustrated in FIG. 1 is in the form of a 2/2-way valve which is closed in the base position, for which purpose a compression spring 15 is interposed between the magnetic core 12 and the armature 9.

The invention is not limited to the solenoid valve represented in FIG. 1, but rather is universally applicable, independently of the particular valve assembly to be produced.

The invention claimed is:

1. A valve assembly comprising at least one transverse channel in a substantially tubular valve housing, with a valve-closing member arranged movably in the valve housing and directed towards a valve seat which is arranged on a hollow-cylindrical valve seat body connected to the valve housing and mounted on one end of the valve housing, wherein the transverse channel is formed by a longitudinal slot which, starting from the end of the valve housing, extends into the valve housing over a section thereof in its longitudinal direction.

2. The valve assembly as claimed in claim 1, wherein the transverse channel is produced in combination with the shaping of the valve housing in a single work cycle.

3. The valve assembly as claimed in claim 1, wherein the transverse channel and the valve housing are produced by a cold-forming process.

4. The valve assembly as claimed in claim 1, wherein a plurality of transverse channels are distributed uniformly around a circumference at the end of the valve housing, whereby the end of the valve housing has a crown-shaped contour as a result of the transverse channels configured as longitudinal slots.

5. The valve assembly as claimed in claim 1, wherein the transverse channel is directly delimited by the valve seat body mounted in a liquid-tight manner on the end of the valve housing.

6. The valve assembly as claimed in claim 5, wherein the valve seat body is pressed into or onto the end of the tubular valve housing over a wall section thereof.

7. The valve assembly as claimed in claim 6, wherein the valve seat body, in order to limit the depth to which it is pressed into or onto the valve housing, has an axial stop which bears against the wall section of the valve housing which delimits the transverse bore(s).

8. The valve assembly as claimed in claim 1 further comprising a projection on the valve seat body that is located on a side of the valve seat body oriented away from the valve housing, wherein the projection is fixed in a liquid-tight manner in a valve-receiving bore by a press fit.

9. The valve assembly as claimed in claim 8, wherein the projection has on its outer periphery a plurality of grooves or a fir-cone contour in order to maximize a sealing and fixing effect.

10. The valve assembly as claimed in claim 8, wherein the valve housing is fixed in a valve-receiving body by a process of external caulking of housing material adjacent to the valve-receiving bore and exertion of axial force in the direction of the valve seat body.

* * * * *